(12) United States Patent
Davidson, Jr. et al.

(10) Patent No.: US 12,114,168 B2
(45) Date of Patent: Oct. 8, 2024

(54) UNMANNED AERIAL VEHICLE AUTHORIZATION SYSTEM AND METHOD

(71) Applicant: THE BOEING COMPANY, Chicago, IL (US)

(72) Inventors: Darcy Lynn Davidson, Jr., Dallesport, WA (US); Matthew Jacob Bartow, Hood River, OR (US); David B. Rathbun, White Salmon, WA (US)

(73) Assignee: THE BOEING COMPANY, Chicago, IL (US)

( * ) Notice: Subject to any disclaimer, the term of this patent is extended or adjusted under 35 U.S.C. 154(b) by 270 days.

(21) Appl. No.: 17/662,705

(22) Filed: May 10, 2022

(65) Prior Publication Data

US 2023/0292133 A1  Sep. 14, 2023

Related U.S. Application Data

(63) Continuation-in-part of application No. 17/653,990, filed on Mar. 8, 2022.

(51) Int. Cl.
*H04W 12/72* (2021.01)
*B64C 39/02* (2023.01)
*G08G 5/00* (2006.01)
*H04L 9/32* (2006.01)
*H04W 12/06* (2021.01)

(52) U.S. Cl.
CPC .......... *H04W 12/72* (2021.01); *G08G 5/0013* (2013.01); *G08G 5/0069* (2013.01); *H04L 9/3236* (2013.01); *H04W 12/06* (2013.01)

(58) Field of Classification Search
CPC ..... H04W 12/72; H04W 12/06; H04W 12/00; G08G 5/0013; G08G 5/0069; G08G 5/00; H04L 9/3236; H04L 9/3247; H04L 9/00; B64C 39/02; B64C 39/024
See application file for complete search history.

(56) References Cited

U.S. PATENT DOCUMENTS

| | | | |
|---|---|---|---|
| 9,626,874 B1 * | 4/2017 | Gupta | G08G 5/0082 |
| 10,741,088 B1 * | 8/2020 | Walker | G08G 5/0013 |
| 10,872,533 B1 * | 12/2020 | Walker | G08G 5/0026 |

(Continued)

FOREIGN PATENT DOCUMENTS

| | | | | |
|---|---|---|---|---|
| EP | 4040251 A1 * | 8/2022 | | B60L 53/12 |
| WO | WO-2021160484 A1 * | 8/2021 | | B60L 53/51 |
| WO | WO-2022187717 A1 * | 9/2022 | | B64F 1/18 |

*Primary Examiner* — Yonel Beaulieu
(74) *Attorney, Agent, or Firm* — The Small Patent Law Group LLC; Philip S. Hof

(57) ABSTRACT

An authorization system includes a controller of an external computing device communicatively connected to an unmanned aerial vehicle (UAV). The controller obtains a mission kit that includes software for controlling a piece of equipment configured to be assembled on the UAV. The controller receives a license that is associated with a user and determines, based on the license, whether the piece of equipment is authorized for operation on the UAV as controlled by the user. Responsive to determining that the piece of equipment is authorized, the controller initiates transmission of at least some of the software of the mission kit to the UAV for installation by the UAV to allow the user to operate the piece of equipment.

20 Claims, 3 Drawing Sheets

(56) References Cited

U.S. PATENT DOCUMENTS

| | | | |
|---|---|---|---|
| 2006/0294393 A1* | 12/2006 | Mc Call | H04L 9/3231 |
| | | | 713/186 |
| 2018/0270244 A1* | 9/2018 | Kumar | H04W 4/44 |
| 2020/0265723 A1 | 8/2020 | Gordon et al. | |
| 2021/0088337 A1* | 3/2021 | Koubaa | G01C 21/20 |
| 2022/0351628 A1* | 11/2022 | Ali | G06Q 10/06311 |
| 2024/0076061 A1* | 3/2024 | Gil | B64F 1/04 |
| 2024/0076066 A1* | 3/2024 | Moore | G05D 1/0808 |
| 2024/0078913 A1* | 3/2024 | Ali | G08G 5/0069 |

\* cited by examiner

UNMANNED AERIAL VEHICLE AUTHORIZATION SYSTEM AND METHOD

CROSS-REFERENCE TO RELATED APPLICATIONS

This application is a continuation-in-part of U.S. patent application Ser. No. 17/653,990, filed on Mar. 8, 2022, and the entire disclosure of which is incorporated herein by reference.

FIELD OF THE DISCLOSURE

Embodiments of the present disclosure generally relate to unmanned aerial vehicles (UAV) and equipment installed on the UAVs.

BACKGROUND OF THE DISCLOSURE

UAVs, which are also referred to as drones and unmanned aerial systems (UAS), are remote-controlled or autonomously-controlled aerial vehicles. UAVs can be used to perform various tasks, such as to survey an area along the ground from high above to provide a bird's eye view of the area. Other tasks may include serving as a communication device that relays messages between two or more communication devices that are not able to directly communicate with each other, generating environmental measurements to monitor weather or the like, providing navigational services, estimating a distance between two points, discharging a weapon for military operations, carrying an object for commercial delivery or an emergency service, and the like. UAVs include propulsion systems that enable and control takeoff, flight, and landing operations of the UAVs. The propulsion system of a UAV may include one or more motors that generate torque for rotating propeller blades, which provide thrust to maintain flight.

At least some UAVs have modular architectures which enhance utility by enabling customization and modification of the equipment installed onboard the UAV. For example, equipment may be added to the UAV and/or removed from the UAV depending on various considerations, such as the task(s) that are desired to be performed by the UAV and the weight of the UAV with the equipment installed. Similar to accessories on a tractor, the base structure of the UAV may accommodate various different types and combinations of equipment installed thereon to perform different operational functions. The equipment selectively installed on the base structure of the UAV may include imaging devices, radar devices, radio devices, light systems, navigational systems, weapons, effector devices for carrying objects, and the like.

Although a UAV may be capable of installing a variety of different types of equipment, some equipment may not be appropriate for certain users that operate the UAV, due to safety reasons, economic reasons, privacy reason, and/or the like. For example, a civilian should not be permitted to install and operate a military-grade weapon on a UAV controlled by the civilian. In another example, a civilian may not be permitted to operate a UAV outfitted with an imaging device within a first proximity of a private residence for privacy reasons. Even if outside of the first proximity but within a second proximity of the private residence, the civilian may not be permitted to operate the imaging device if the imaging device is high-powered with the capability of generating image data that infringes privacy rights of the resident. Another reason to restrict usage of some equipment may be economic-based, such as tiered payment structures for operating the UAV. For example, a user may pay an owner of a UAV for a license to operate the UAV, and the license may dictate a subset of equipment that is available for the user to operate. The user would not be permitted or authorized to operate equipment on the UAV that exceeds the bounds of the license.

SUMMARY OF THE DISCLOSURE

A need exists for effectively and reliably restricting the operation of a UAV, including the operation of pieces of equipment onboard the UAV, based on a user that intends to control the UAV. With those needs in mind, certain embodiments of the present disclosure provide an authorization system that includes a controller of an external computing device that is off-board an unmanned aerial vehicle (UAV) and communicatively connected to the UAV. The controller includes one or more processors and is configured to obtain a mission kit that includes software for controlling a piece of equipment configured to be assembled on the UAV. The controller is configured to receive a license that is associated with a user and determine, based on the license, whether the piece of equipment is authorized for operation on the UAV as controlled by the user. Responsive to determining that the piece of equipment is authorized, the controller initiates transmission of at least some of the software of the mission kit to the UAV for installation by the UAV to allow the user to operate the piece of equipment.

Certain embodiments provide a method for authorizing operation of a UAV. The method includes obtaining a mission kit by a controller of an external computing device that is off-board a UAV. The mission kit includes software for controlling a piece of equipment configured to be assembled on the UAV. The method includes receiving a license that is associated with a user, and determining, based on the license, whether the piece of equipment is authorized for operation on the UAV as controlled by the user. Responsive to determining that the piece of equipment is authorized, the method includes transmitting at least some of the software of the mission kit to the UAV for installation by the UAV to allow the user to operate the piece of equipment.

Certain embodiments provide an authorization system that includes a memory device of an external computing device that is off-board a UAV, a communication circuit of the external computing device, and a controller of the external computing device. The memory device stores a mission kit that includes software for controlling a piece of equipment configured to be assembled on the UAV. The mission kit includes multiple profiles that have different operational constraints for limiting operation of the piece of equipment. The communication circuit is configured to communicate with the UAV. The controller includes one or more processors and is communicatively connected to the memory device and the communication device. The controller is configured to receive a license that is associated with a user and to determine, based on the license, whether each of the profiles of the mission kit is an authorized profile that is authorized for operation on the UAV as controlled by the user. Responsive to the controller identifying one or more authorized profiles of the mission kit, the controller is configured to control the communication circuit to transmit at least one of the one or more authorized profiles to the UAV for installation by the UAV to allow the user to operate the piece of equipment.

DETAILED DESCRIPTION OF THE DISCLOSURE

Figure 1:
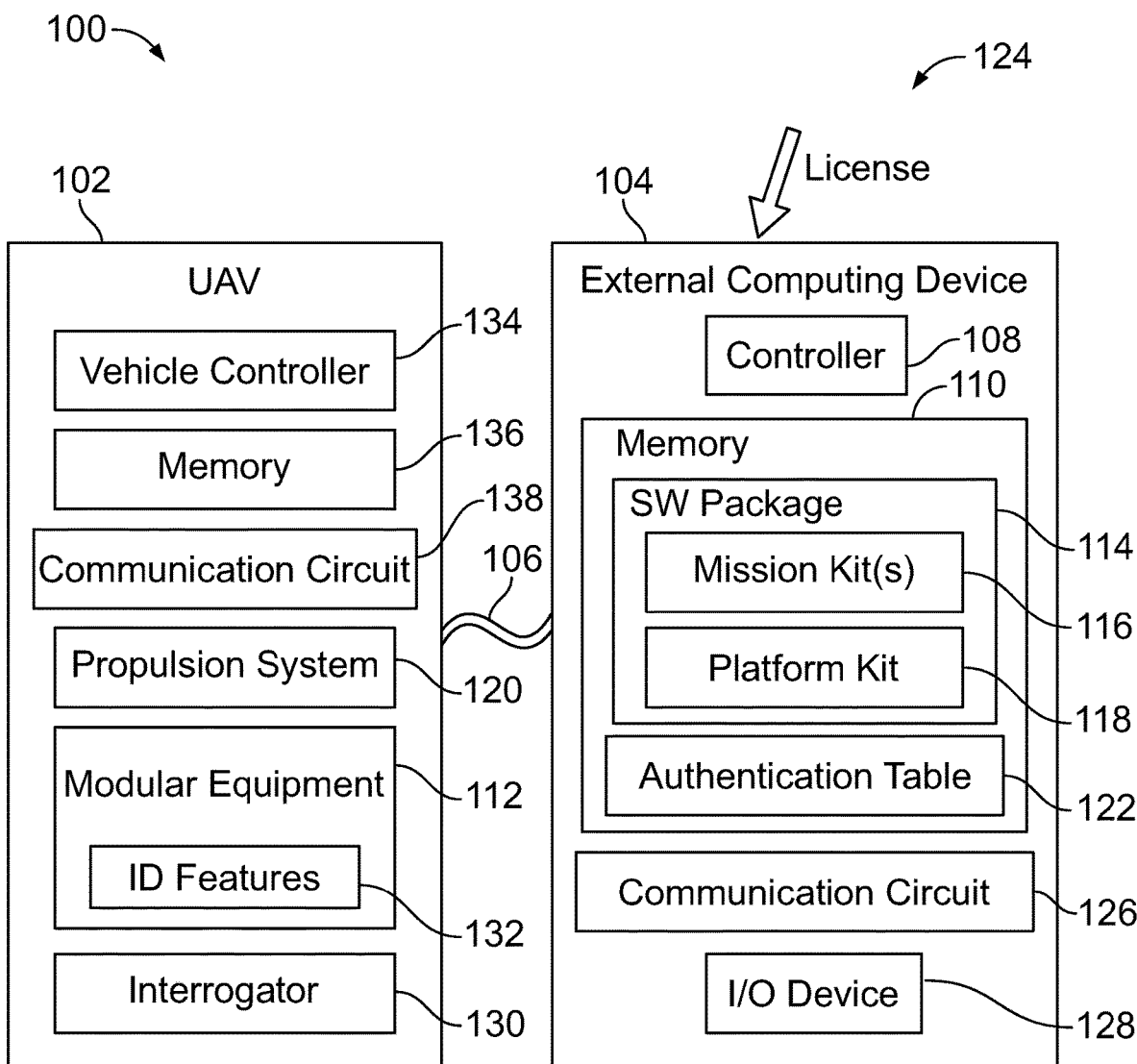
FIG. 1 is a block diagram of an authorization system according to an embodiment of the present disclosure.

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular condition can include additional elements not having that condition.

Certain embodiments of the present disclosure provide an authorization system that restricts operation of the UAV and the equipment installed on the UAV based on a license associated with the user. For example, a user that provides a license indicating higher credentials will be permitted broader operating permissions than if the user submitted a license indicating lower credentials. The authorization system disclosed herein controls the software that is installed onboard the UAV based on the license. The installed software is a limiting factor that restricts operation of the UAV and the equipment assembled on the UAV. For example, if the license does not permit operation of a certain piece of equipment, then the software necessary for operating that piece of equipment is not installed on the UAV. As a result, even if an unauthorized piece of equipment is assembled on the UAV, the UAV lacks the programmed instructions necessary to operate the unauthorized equipment. This software filtering may be performed at least in part by an external computing device that is off-board the UAV. The external computing device may only transmit the software that controls permitted equipment to the UAV. As a result, a user is not able to operate the UAV, including the equipment thereof, in a way that exceeds license-based constraints.

The authorization system and method disclosed herein is fundamentally different from known techniques for limiting the operation of UAVs based on certain factors, such as a fee, as described in U.S. Patent Application No. 2020/0265723. At least some known techniques may install an entire software package onboard a UAV, where the software package includes software that enables operation of a variety of different types of equipment. The known techniques attempt to restrict the use of the UAV and/or of the equipment by prohibiting access to unauthorized equipment hardware and/or prohibiting access to the software onboard the UAV that controls the unauthorized equipment. But, bad actors may overcome both of these safeguards. For example, a bad actor may be able to purchase or otherwise obtain an unauthorized piece of equipment by transacting with an unlicensed supplier of the equipment or by providing falsified user credentials to a licensed supplier. The second safeguard may use encryption and/or other security measures to block access to the software onboard the UAV that controls equipment, at least until proper credentials are submitted to authenticate the user. Similar to the hardware safeguard, a bad actor may improperly activate the dormant, hidden software by either hacking the system to circumvent the authentication step or by submitting forged credentials that satisfy the authentication step. The end result is that bad actors may be able to circumvent the safeguards in place, and utilize unauthorized software onboard the UAV to achieve operation of unauthorized equipment. The authorization system and method described herein avoids this result. Even if a bad actor improperly obtains and installs an unauthorized piece of equipment on a UAV, the software needed to operate the unauthorized equipment will not be present onboard the UAV, so the equipment is non-operable.

FIG. 1 is a block diagram of an authorization system 100 according to an embodiment. The authorization system 100 includes a UAV 102 and an external computing device 104 that is off-board the UAV 102. The external computing device 104 is communicatively connected to the UAV 102 via a wired or wireless communication pathway to transmit software from the external computer device 104 to the UAV 102. In the illustrated embodiment, a cable 106 extends from the external computer device 104 to the UAV 102 and provides a wired conductive pathway. The cable 106 may be an electrical cable or an optical cable. The software is transmitted along the cable 106 in the form of electrical or optical signals. The cable 106 is disconnected from the UAV 102 and/or the external computing device 104 after the software transmission is complete, such that the UAV 102 is untethered from the external computing device 104 while the UAV 102 travels. In an alternative embodiment, the external device 104 wirelessly transmits the software to the UAV 102, via a wireless communication pathway, without the use of the cable 106 or any other physical element mechanically connecting the two components.

The external computing device 104 may be a laptop computer, a tablet computer, a smartphone, a desktop computer or workstation, a server, or another type of computer. Portable computers, such as laptops, tablets, and smartphones, may be beneficial for serving as the external computing device 104 because such computers can easily be carried to the location of the UAV 102. The external computing device 104 includes a controller 108 that represents hardware circuitry that includes and/or is connected with one or more processors (e.g., one or more microprocessors, integrated circuits, microcontrollers, field programmable gate arrays, etc.). The controller 108 includes and/or is connected with a tangible and non-transitory computer-readable storage medium, referred to herein as memory 110. The memory 110 may store programmed instructions (e.g., software) that are executed by the controller 108 to perform aspects of the UAV authorization system and method described herein. For example, the programmed instructions may include an algorithm utilized by the controller 108 to analyze a license that is received and determine whether the license permits a user associated with the license to control operation of the UAV 102, including operation of one or more pieces of equipment 112 installed on the UAV 102. The programmed instructions may also dictate responsive actions to be performed by the controller 108 based on the determination. The memory 110 may store applications, such as various application program interfaces (APIs) that link to cloud hosting services for accessing information from remote storage devices, such as servers at data centers.

In an embodiment, the memory 110 stores a software package 114 that includes software for enabling operation of the UAV 102. The controller 108 may selectively authorize at least some of the software in the software package 114, and may transmit the authorized software to the UAV 102 to enable equipment of the UAV 102 that corresponds to the authorized software to operate. The software in the software package 114 is not stored onboard the UAV 102 until the external computing device 104 transmits the authorized software of the software package 114 to the UAV 102. The controller 108 determines the software that is authorized based on a received license. Any portions of the software package 114 that are not authorized are not transmitted to the UAV 102. For example, the controller 108 may prevent transmission of software that is not positively authorized. The controller 108 may transmit the authorized software without transmitting the unauthorized software by retrieving the authorized software from the memory 110 and generating a supply message that includes only the authorized software from the package 114. The controller 108 may then generate a control signal to initiate transfer of the supply message to the UAV 102 (e.g., along the cable 106).

The software package 114 may include one or more mission kits 116 and one or more platform kits 118. Each mission kit 116 includes software for controlling a piece of equipment 112 that is configured to be assembled on the UAV 102. If multiple mission kits 116 are present, the mission kits 116 correspond to different pieces of equipment 112. For example, a first mission kit 116 includes software for controlling a first piece of equipment 112, and a second mission kit 116 includes software for controlling a second piece of equipment 112. The pieces of equipment 112 refer to payload, accessories, attachments, sensors, and the like that can be assembled to the UAV 102 and operate, according to software, to perform a function. Some non-limiting examples of equipment 112 can include an imaging device (e.g., camera), a lighting system, a navigation system (e.g., GPS receiver), a laser device, a radar device, a radio device, a weapon, and an effector device for carrying objects.

The mission kits 116 may include both program code and software drivers. The software drivers interact with the equipment 112. Alternatively, the software drivers may be pre-installed on the UAV 102, and not included in the mission kits 116. The mission kits 116 may be specific to the equipment, not the vehicle. For example, the software of a mission kit 116 directed to control of a laser may be compatible in different types of UAVs and potentially even vehicles other than UAVs. The mission kits 116 in the software package 114 optionally may not entirely match the equipment that is actually assembled on the UAV 102, due in part to the modular nature of the equipment. For example, the software package 114 may include a mission kit 116 that controls operation of a LiDAR device, but no LiDAR device may be currently installed on the UAV 102. In that case, the controller 108 prevents the transmission of the LiDAR-controlling software from that mission kit 116 to the UAV 102.

In an embodiment, if a first mission kit 116 includes software for controlling an imaging device, then the software may dictate how the imaging device rotates, zooms, generates image data, stores image data, adjusts lighting, and the like. The UAV 102 may not be able to operate an imaging device, which corresponds to the first mission kit 116, without receiving at least some of the software of the first mission kit 116. Stated differently, until software of the first mission kit 116 is transmitted to the UAV 102, the imaging device installed on the UAV 102 may be inoperable.

The platform kit 118 includes software for controlling core operations of the UAV 102. The platform kit 118 may be specific to the UAV 102. The software may dictate control of core equipment onboard the UAV 102, such as a propulsion system 120 and avionics. The core equipment is equipment that is necessary for basic operations of the UAV 102, such as controlled takeoff, flight, and landing. The core equipment is distinguishable from the modular equipment 112 that can be selectively removed and replaced without preventing the UAV 102 from achieving flight. In an embodiment, the UAV 102 is not able to fly until the UAV 102 receives the platform kit 118 from the external computing device 104. Optionally, the software package 114 may include multiple platform kits 118 that are directed to different types of UAVs 102, such as different makes and/or models. The controller 108 may transmit to the UAV 102 only the software from the particular platform kit 118 directed to the make and/or model of the UAV 102.

In an alternative embodiment, the software for controlling the core equipment is pre-installed on the UAV 102, and is not part of the software package 114 within the memory 110 of the external computing device 104. For example, the software package 114 may include multiple mission kits 116 and no platform kit 118.

In an embodiment, the memory 110 of the external computing device 104 may store a look-up table 122 for authenticating a license 124 that is received at the computing device 104. The look-up table 122 is referred to herein as an authentication table 122. The authentication table 122 stores minimum user credentials for each of different modular equipment 112 that can be assembled on the UAV 102. The minimum user credentials refer to a threshold credential level that must be satisfied or surpassed by a user to permit the use of a respective piece of equipment 112 onboard the UAV 102.

The license 124 is associated with a specific user that seeks to control operation of the UAV 102. The user may represent a person, a group of people, a business entity, or the like. The license 124 provides credentials of the user. The credentials may be based on one or more factors, such as an amount of money paid to acquire the license, an employment position of the user, a clearance level of the user, experience of the user with similar UAVs and the equipment of the UAVs, and/or the like. For example, the license 124 may be purchased for a fee. Optionally, the fee structure may be tiered, such that paying more can purchase a license that unlocks additional benefits or permissions for operating the UAV 102 over a lower-tier license. The particular license 124 may be identified or indicated via receipt of a token, a key, a password, a username, a wireless message, or the like.

The external computing device 104 may include a communication circuit 126 that enables the external computing device 104 to communicate with the UAV 102 via a wired pathway along the cable 106 or a wireless pathway. The communication circuit 126 may include or represent one or more antennas, one or more transceivers (or discrete transmitters and receivers), and associated circuitry. The controller 108 is communicatively connected to the communication circuit 126 via one or more electrically conductive elements to control the operation of the communication circuit 126. For example, the controller 108 may use the communication circuit 126 to transmit authorized software of the software package 114 to the UAV 102. The communication circuit 126 may also be used by the controller 108 to communicate messages to other recipient devices, such as to notify a user whether or not the license 124 associated with the user has been validated or authenticated and/or whether or not the user can proceed with controlling the UAV 102 within designated operational constraints. The communication circuit 126 may receive messages that are transmitted from other sources, and provide the content of the messages to the controller 108 for processing and analysis. For example, the communication circuit 126 may receive a message that includes the license 124, and forwards the license 124 to the controller 108.

The external computing device 104 may include an input and output (I/O) device 128 that is communicatively connected to the controller 108 via one or more electrically conductive elements. The I/O device 128 includes one or more devices for providing user inputs, such as a touch screen, a touchpad, a keyboard, buttons, a dial, a microphone, and the like. A user may use the I/O device 128 to generate user inputs that are conveyed to the controller 108. The user may generate a user input to, for example, submit the license 124 to the external computing device 104. For example, the user may type in a username and/or password, via the I/O device 128 to log into a program or application on the external computing device 104 for accessing the license 124 (e.g., user credentials) of the user. The I/O device 128 may include one or more devices for providing information to the user, such as a display screen, an audio speaker, and the like. A graphical user interface (GUI) of the program or application may be presented on the display screen for viewing by the user.

The UAV 102 includes a vehicle controller 134 that controls operations of the UAV 102. For example, the vehicle controller 134 may generate control signals for controlling operations of the propulsion system 120 and the equipment 112 that is onboard the UAV 102. The vehicle controller 134 represents hardware circuitry that includes and/or is connected with one or more processors (e.g., one or more microprocessors, integrated circuits, microcontrollers, field programmable gate arrays, etc.). The controller 134 includes and/or is connected with a tangible and non-transitory computer-readable storage medium, referred to herein as memory 136. The memory 136 may store programmed instructions (e.g., software) that are executed by the controller 134 to control operation of the UAV 102. The memory 136 may also store the authorized software for controlling the equipment 112 that is received from the external computing device 104. The controller 134 may access and/or retrieve the software to control operation of one or more installed pieces of equipment 112, such as an imaging device.

The UAV 102 may include a communication circuit 138 for communicating with other devices, such as the external computing device 104. The communication circuit 138 may be similar to the communication circuit 126 of the computing device 104. The communication circuit 138 may receive wireless messages and messages communicated via wired pathways, such as the software that is transmitted along the cable 106, and then forwards content of the messages to the vehicle controller 134.

The authorization system 100 optionally includes an interrogator device 130 for auditing the modular equipment 112 that is assembled on the UAV 102. The audit is an equipment check performed by the interrogator device 130 on the UAV to determine which pieces of equipment 112 are currently installed. The particular configuration of the UAV 102 that includes the installed equipment 112 is referred to herein as an assembly configuration. Due to the modular architecture, the UAV 102 may have various different assembly configurations by mixing and matching combinations of equipment 112.

In an embodiment, the equipment 112 may include identifier features 132 thereon that uniquely identifies each piece of equipment 112. The identifier features 132 may be smart tags, such as radio frequency identification (RFID) tags or near field communication (NFC) tags. Alternatively, the identifier features 132 may be barcodes, symbols, shapes, text, or other graphical indicia. The identifier features 132 may be in the form of stickers applied to exterior surfaces of the equipment 112. The interrogator device 130 is configured to detect and interpret the identifier features 132 to identify each of the pieces of equipment 112 in the assembly configuration for the equipment check. The interrogator device 130 may be a reader/scanner, such as an RFID reader or NFC reader, an imaging device with processors that perform image analysis to interpret the features 132, or the like. The assembly configuration of the UAV 102 as determined by the interrogator device 130 may be communicated to the controller 108 for analysis.

In the illustrated embodiment, the interrogator device 130 is disposed onboard the UAV 102 and communicatively connected to the vehicle controller 134. The interrogator device 130 may be indirectly communicatively connected to the controller 108 of the external computing device 104 via the communication circuits 138, 126, such that a message containing the assembly configuration is sent to the external computing device 104. In this arrangement, the controller 108 of the external computing device 104 may generate a configuration request message that is communicated to the UAV 102 when the controller 108 desires the current assembly configuration of the UAV 102. The interrogator device 130 may perform the equipment check in response to receiving the configuration request message. In another embodiment, the interrogator device 130 may be off-board the UAV 102, such as integrated with the external computing device 104. The interrogator device 130 may be moved relative to the UAV 102 to enable the interrogator device 130 to read the identifier features 132 and communicate the assembly configuration to the controller 108.

The authorization system 100 is used to determine whether a user that desires to control the UAV 102 is authorized, and, if so, to what extent that user is allowed to operate the UAV 102. The authorization system 100 can impose different constraints on the use of the equipment 112 onboard the UAV 102 and/or the movement of the UAV 102 based on a level of permission granted to the particular user. The authorization system 100 also limits the software that is onboard the UAV 102 to enhance security by preventing bad-actor users from hacking into dormant, unauthorized software onboard the UAV 102 in order to achieve control capabilities that exceed the granted permission level of the users.

In an embodiment, the controller 108 of the external computing device 108 obtains the software package 114. The software package 114 may be obtained by downloading the software package 114 from a remote device across a network (e.g., the Internet, a LAN, or the like). The controller 108 may obtain the contents of the software package 114, such as the one or more mission kits 116, by accessing the memory 110 and retrieving the software from the memory 110.

The controller 108 receives a license 124 that is associated with a user. The license 124 may be received as a wireless message by the communication circuit 126. The license 124 may be received as a user input on the I/O device 128, or even received from a network in response to a user input on the I/O device 128. For example, a remote server may transmit the license in response to the user logging into a user profile of a program/application. Alternatively, the license 124 may be received by the user scanning a document, inserting a key, swiping a key card, or the like. The content of the license 124 is conveyed to the controller 108. The license 124 may include user credentials of the user, where the credentials relate to the fitness of the user for operating the UAV 102 and equipment 112 that may be present onboard the UAV 102. For example, the user credentials may state a clearance level of the user, an experience level of the user, an employment title or position of the user, and/or a permission level unlocked due to payment or the like.

The controller 108 determines which software present in the software package 114, if any, is to be conveyed to the UAV 102 based on an analysis of the license 124. For example, the controller 108 determines whether the license grants the user permission to use each of various different pieces of equipment associated with the mission kits 116. If the software package 114 includes five mission kits 116 associated with five different pieces of equipment, the controller 108 may independently determine whether each piece of equipment is authorized for operation on the UAV 102 while under the control of the user. For example, the license 124 may provide a list of authorized equipment for the user, a list of authorized mission kits 116 associated with authorized equipment, or the like. Alternatively, the license 124 may provide user credentials, and the controller 108 determines the authorized equipment by comparing the credentials from the license 124 to the minimum user credentials stored in the authentication table 122. If the credentials of the user satisfy the minimum user credentials for an imaging device, then the controller 108 determines that the imaging device onboard the UAV 102 is authorized. Furthermore, the mission kit 116 that includes software for controlling the imaging device is classified as an authorized mission kit. The controller 108 may transmit at least some software from authorized mission kits to the UAV 102 to enable operation of the authorized equipment when controlled by the user. The controller 108 does not transmit software from any mission kit 116 directed to equipment 112 that is not authorized for operation on the UAV 102 as controlled by the user.

In an embodiment, before transmitting software to the UAV 102, the controller 108 may obtain the equipment check from the interrogator device 130 to analyze the assembly configuration of the UAV 102. It is possible that some authorized pieces of equipment based on the license 124 are not present on the UAV 102 in the current assembly configuration. In that case, the controller 108 may not transmit software to the UAV 102 for controlling pieces of equipment that are not present on the UAV 102, regardless of whether the software is authorized. For example, a first mission kit 116 that is authorized may include software for controlling operation of a laser system, but the UAV 102 in the assembly configuration, according to the equipment check, either lacks a laser system or lacks the specific laser system that is controlled by the first mission kit 116. The controller 108 may block or prevent the transmission of software of the first mission kit 116 to the UAV 102. In this way, the UAV 102 does not receive software specific to equipment that is not present on the UAV 102.

The controller 108 may also compare the platform kit 118 to the license 124 and/or the assembly configuration of the UAV 102 to determine if the software in the platform kit 118 is authorized for the UAV 102 as controlled by the user. The controller 108 may also compare the platform kit 118 to the assembly configuration of the UAV 102 to determine if the software in the platform kit 118 is compatible with the UAV 102. Optionally, the software package 114 may have multiple platform kits 118, and the controller 108 determines which platform kit 118 to send to the UAV 102 based on this analysis.

After determining which mission kits 116 are directed to equipment that is authorized and which equipment is present on the UAV 102, the controller 108 initiates the transfer of software for controlling the pieces of equipment 112 that are both authorized and present onboard the UAV 102. For example, if a first mission kit 116 includes software for controlling an effector device for carrying an object, and the controller determines that the effector device is both authorized based on the license 124 and currently installed or assembled on the UAV 102, then the controller initiates transfer of at least some of the software of the first mission kit 116 to the UAV 102. The controller 108 may generate a supply message that compiles software from the authorized mission kits 116 and the authorized platform kit 118 (which matches the type of UAV 102). The controller 108 may initiate the transfer by generating a control signal that directs the communication circuit 126 to transmit the supply message to the UAV 102, either along the removable cable 106 or wirelessly. The supply message does not include software that is directed to control of equipment 112 that is not authorized for the user and/or that is not present on the UAV 102. Such software remains in the memory 110 of the external computing device 104.

Upon receipt of the software in the supply message, the vehicle controller 134 may install the software onboard the UAV 102. Installing the software from the platform kit 118 allows the vehicle controller 134 to operate the core equipment of the UAV 102, such as the propulsion system 120 and avionics. Installing the software from the one or more mission kits 116 allows the vehicle controller 134 to operate the modular equipment 112 that is authorized for the user based on the license 124. For example, after installing the software from a mission kit 116 directed to an imaging device, the user may be able to control operations of the imaging device while operating the UAV 102, at least within designated operating constraints. The operations of the imaging device controlled by the user may include manipulating the field of view of the imaging device, generating image data via the imaging device, controlling settings of the imaging device, and/or the like. While under the control of the user, the user is not able to use illicit means, such as hacking, to achieve control of unauthorized equipment because the software necessary for operating such unauthorized equipment is not onboard the UAV 102.

Figure 2:
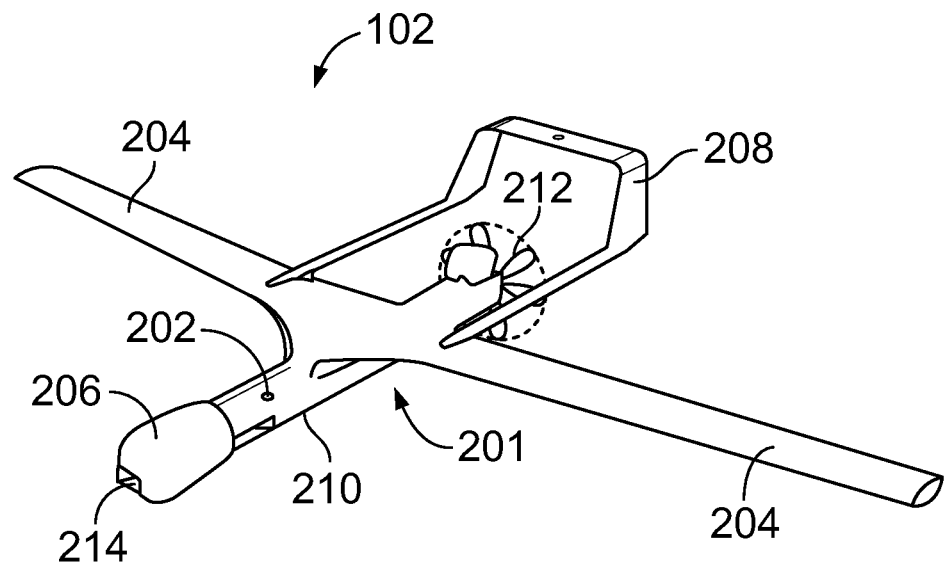
FIG. 2 illustrates a UAV according to an embodiment of the present disclosure.

FIG. 2 illustrates the UAV 102 according to an embodiment. The UAV 102 has an airframe body 201 that includes a fuselage 202, wings 204, a nose 206, an empennage 208, and a payload bay 210. The UAV 102 includes the propulsion system 120, which may include or represent a power motor unit (PMU). The propulsion system 120 includes at least one propeller 212 in the illustrated embodiment. Avionics and other circuitry, as well as a power source for powering the propulsion system 120, may be located within the nose 206 and/or fuselage 202. The modular pieces of equipment 112 that are onboard the UAV 102 may be mounted to the nose 206, the payload bay 210, and/or the fuselage 202. For example, an imaging device 214 may be mounted to the nose 206. The imaging device 214 may include a camera, such as a high definition camera that generates image data in the visible wavelength range, a thermal imaging camera, a night vision camera, and/or the like.

Figure 3:
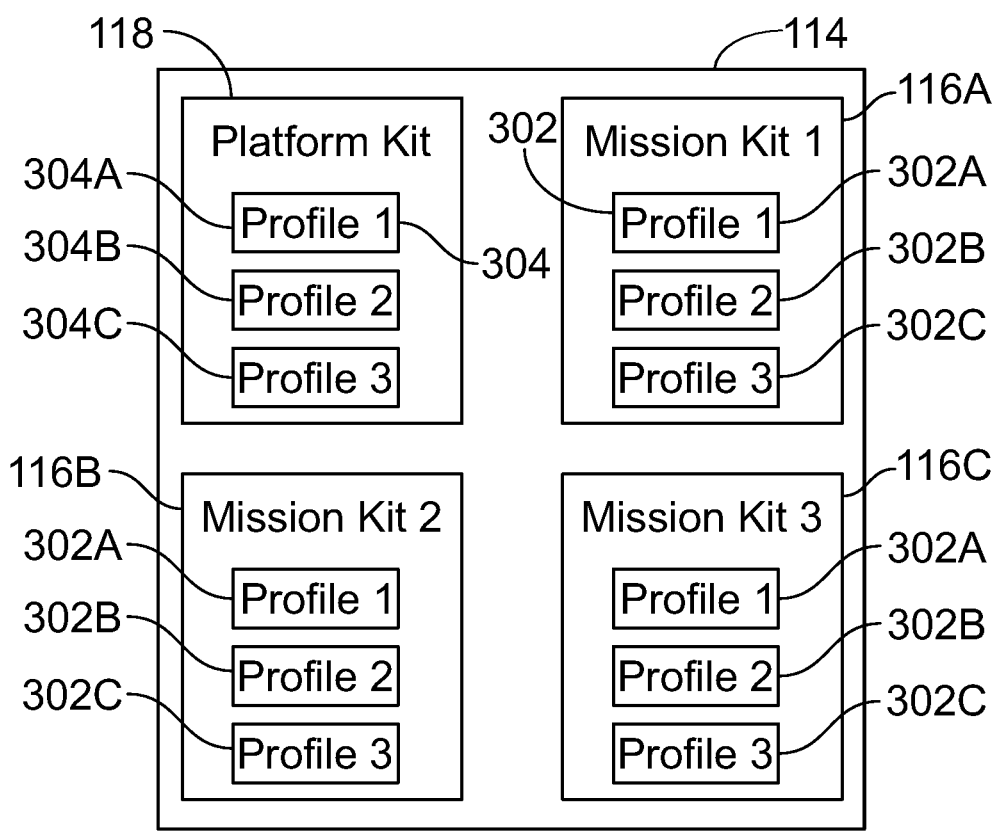
FIG. 3 is a block diagram of a software package according to an embodiment of the present disclosure.

FIG. 3 is a block diagram of the software package 114 according to an embodiment. The software package 114 in the illustrated embodiment includes one platform kit 118 and three mission kits 116A, 116B, 116C. The software package 114 may have zero or more than one platform kit 118 and/or one, two, or at least four mission kits 116 in other embodiments. In an embodiment, each mission kit 116A-C includes multiple profiles 302 that have different operational constraints for limiting operation of the piece of equipment 112 that is controlled by the respective mission kit 116A-C. For example, if the first mission kit 116A includes software for controlling operation of the imaging device, then a first profile 302A of the first mission kit 116A has a first set of operational constraints for limiting operation of the imaging device, the second profile 302B has a second set of operational constraints for limiting operation of the imaging device, and the third profile 302C has a third set of operational constraints for limiting operation of the imaging device. The profiles 302 are software that dictate how the piece of equipment is permitted to perform in the field. The operational constraints may designate limits on control settings and/or operating parameters of the piece of equipment 112.

The different profiles 302 of a common mission kit 116 may have operational constraints that overlap and have different breadth, enabling different scope of operation of the piece of equipment 112. For example, the first profile 302A of a given mission kit 116 may have the most limited or restrictive operational constraints. The second profile 302B may have broader, less restrictive operational constraints than the first profile 302A, enabling a broader scope of operation of the piece of equipment than the operational constraints of the first profile 302A. The third profile 302C may have the broadest, least restrictive operational constraints of the profiles 302, enabling the broadest scope of operation of the piece of equipment.

Optionally, at least some of the different profiles 302 of a common mission kit 116 may have non-overlapping operational constraints. For example, the first profile 302A may enable operating the piece of equipment 112 in a first mode of operation, and the second profile 302B may enable operating the piece of equipment 112 in a second mode of operation that is different from the first mode of operation.

In a non-limiting example, the first mission kit 116A is directed to controlling an imaging device. The operational constraints of the first profile 302A of the first mission kit 116A may enable high resolution magnification of image data generated by the imaging device. The operational constraints of the second profile 302B may enable the generation of thermal image data (e.g., in the IR range). The operational constraints of the third profile 302C may enable generation of night vision image data.

The second mission kit 116B may be directed to controlling a radio device. The operational constraints of the first profile 302A of the second mission kit 116B may limit operation of the radio device in a non-encrypted mode and a low power mode. The operational constraints of the second profile 302B may allow the radio device to operate in either the non-encrypted mode or an encrypted mode in the low power mode. The operational constraints of the third profile 302C may allow the radio device to operate in either the non-encrypted mode or an encrypted mode in either the low power mode or a high power mode.

The third mission kit 116C may be directed to controlling a laser device, which may be a laser rangefinder, a laser scanning device (e.g., LiDAR), a laser communication device, or the like. The operational constraints of the first profile 302A of the third mission kit 116C may limit operation of the laser device to a low power mode. The operational constraints of the second profile 302B may allow the laser device to operate in either the low power mode or a high power mode. The laser device in the high power mode may generate higher-powered beams than in the low power mode, which can extend the operating range of the laser device at the expense of consuming more power. The operational constraints of the third profile 302C may enable higher resolution scanning than the operational constraints of the first and second profiles 302A, 302B. Alternatively, the operational constraints of the first profile 302A allows only the low power mode, the second profile 302B allows operation in either the low power mode or a medium power mode (as selected by the user), and the third profile 302C allows operation in either the low power mode, the medium power mode, or the high power mode (as selected by the user).

The above examples are provided for explanation only. The mission kits 116A-C may have more or less than three profiles 302 in other embodiments, and the profiles 302 may dictate different operational constraints than the constraints mentioned above. Furthermore, the software package 114 is not limited to mission kits 116 directed to control of an imaging device, a radio device, and a laser device.

As described above, the controller 108 authorizes at least some of the software to be transferred to the UAV 102 based on the license 124. The software that is transferred may be based in part on a determination, based on the license 124, whether each profile 302 of a given mission kit 116 is authorized. Profiles 302 that are authorized are referred to as authorized profiles. Each profile 302 may have a designated minimum user credential threshold that the license 124 has to satisfy in order for the authorization system 100 to enable the user to operate the equipment within the permitted operational constraints. For example, with reference to the first mission kit 116A, the controller 108 may analyze the license 124 and determine that the credentials of the license 124 satisfy the minimum user credentials of the second profile 302B and the third profile 302C, but not the first profile 302A. Thus, the controller 108 designates the second profile 302B and the third profile 302C as authorized profiles that is authorized for installation on the UAV 102 as controlled by the user. The controller 108 may designate the first profile 302A as an unauthorized profile in this example.

The supply message that is transmitted to the UAV 102 from the external computing device 104 may include the software of the first mission kit 116A that corresponds to the authorized second and third profiles 302B, 302C. The controller 108 may prevent the transmission of the software of the first mission kit 116A that corresponds to the first profile 302A, which is unauthorized. For example, the software corresponding to the first profile 302A is not included in the supply message. After installing the software, the vehicle controller 134 can operate the imaging device according to the operational constraints of the second profile 302B and/or the third profile 302C. In the provided example, the imaging device is permitted by the received software to generate thermal image data and night vision image data, but not to perform high resolution magnification of image data (because that operational constraint/permission is part of the unauthorized first profile 302A). As described above, the software that is transmitted to the UAV 102 may include authorized profiles of mission kits, but not unauthorized profiles.

During operation of the UAV 102 as controlled by the user, each piece of modular equipment 112 can be controlled within the operational constraints dictated by the one or more authorized profiles 302 of the respective mission kit 116.

In the illustrated embodiment, the platform kit 118 includes three profiles 304A-C. The profiles 304A-C may provide constraints on the operation of the core equipment of the UAV 102 when controlled by the user, such as operation of the propulsion system 120. The operational constraints of the platform profiles 304A-C may be directed to movement constraints and/or location constraints. The movement constraints may include speed limits, acceleration limits, turning radius limits, a limit on total travel distance, a limit on travel distance from a reference location, a limit on travel time, and/or the like. The location constraints may include geographic limits (e.g., geofences) for demarcating where the UAV 102 is permitted to travel and where the UAV 102 is prohibited to travel, altitude limits (e.g., do not fly below a lower altitude limit or above an upper altitude limit), restrictions on where the UAV 102 can land, and/or the like.

Like the profiles 302 of the mission kits 116, the profiles 304 of the platform kit 118 may be tiered and at least partially overlapping such that higher-credentialed users are permitted broader control over the movement of the UAV 102 than lower-credentialed users. For example, the first profile 304A of the platform kit 118 may have the most limited or restrictive operational constraints. The second profile 304B may have broader, less restrictive operational constraints than the first profile 304A, enabling a broader scope of operation of the UAV 102 than the operational constraints of the first profile 304A. The third profile 304C may have the broadest, least restrictive operational constraints of the profiles 304A-C, enabling the broadest scope of operation of the UAV 102.

The controller 102 may authorize one or more of the platform profiles 304A-C based on the license 124. The software of one or more authorized platform profiles 304 may be transmitted to the UAV 102 for installation on the UAV 102 to control operation of the propulsion system 120 by the user without exceeding the designated constraints of the authorized platform profile(s) 304.

After determining which mission kits 116, mission kit profiles 302, platform kits 118, and/or platform kit profiles 304 are authorized for installation on the UAV 102, based on the license 124, the controller 108 may generate an authorization message for communication to a communication device possessed by the user, such as a smartphone. The authorization message may provide a list of the equipment onboard the UAV 102 that is authorized to be operated by the user. The authorization message may also describe the operational constraints in effect, based on the mission profiles 302 in effect, that limit the operation of the equipment. The authorization message optionally may also include operational constraints for the movement and location of the UAV 102, based on the platform profile 304 in effect.

Although the controller 108 of the external computing device 104 performs the determinations about which mission kits 116, mission kit profiles 302, platform kits 118, and/or platform kit profiles 304 are authorized for installation on the UAV 102, based on the license 124, according to the embodiments described above, in an alternative embodiment the vehicle controller 134 of the UAV 102 may perform the authorization determinations. For example, after determining which software is authorized for installation onboard the UAV 102, the vehicle controller 134 may communicate a message to the external computing device 104 that identifies and requests the authorized software from the memory 110 of the external computing device 104.

In another embodiment of a UAV 102, the vehicle controller 134 or authorization system 100 may determine if unauthorized software is onboard the UAV 102. Optionally, the license 124 may contain digital signatures of the individual software components (e.g., kits, profiles, etc.) in the software package 114. These digital signatures may be derived from a hash of the particular software component and an entity identifier of the user, business entity, and/or UAV. The entity identifier may be a unique identifier, such as a series of letters and/or numbers that uniquely identify the corresponding component. The entity identifier may be implemented at various levels of hierarchy, including the user organization, the user operational site, or the individual UAV tail number. A digital signature may be assigned for any part of software package 114, including platform kits, mission kits, profiles, and/or the operating system of the vehicle controller 134. Digital signatures may be installed into the memory 136 of the UAV 102 through the data link 106 as part of the software installation process. The interrogator device 130 may contain hardware such as a TPM (trusted platform module) or similar, that stores the assigned entity identifier for that specific UAV 102.

Upon startup of the UAV 102, the vehicle controller 134 may verify the software onboard the UAV 102 by comparing a hash of the software components currently stored in memory 136 against the digital signatures (e.g., the hash of the particular software component and the entity identifier) to determine if the software components have been modified. The controller 134 may perform this comparison while the data connection 106 not in place, or at least not actively transmitting data between the UAV 102 and the external computing device 104. If the license 124 does not permit operation of a certain piece of equipment 112, and unauthorized software necessary for operating that piece of equipment 112 has been installed on the UAV 102, a mismatch results. For example, the hash of the software components currently stored in the memory 136 (e.g., which includes the unauthorized software) would not match the digital signatures and entity identifier, which indicates that the software components may have been modified. If the vehicle controller 134 determines that the software components have been modified, the vehicle controller 134 may perform one or more operations to prevent operation of the UAV 102. For example, the vehicle controller 134 may activate a power lock-out to prevent take-off of the UAV 102 if on the ground. If the UAV 102 is airborne, the vehicle controller 134 may force the UAV 102 to return to ground (e.g., base), or other appropriate action.

This verification process may be made using the interrogator device 130 and/or technology, such as a TPM (trusted platform module) or public/private key encryption, to ensure that a "bad actor" cannot generate correct signatures for modified software components (platform kits, mission kits, or profiles) or alter the UAV assigned user ID in interrogator device 130. The comparison may be made at various levels, including but not limited to, using the operating system of the vehicle controller 134 to compare the signature of the platform kit, using the platform kit to compare the signatures of the mission kits, and using the mission kits to compare the signatures of the profiles.

The verification process may be used to prevent "bad actors" from manually adding software components into the memory 136, via a device other than the external device 104, to enable modular equipment 112 that is unlicensed. The verification process may prevent "bad actors" from modifying profiles of the software package 114 that are already installed in the memory 136 in an effort to enable unlicensed capabilities/operations, and may also prevent "bad actors" from sharing/copying software components resident in the memory 136 to an external device, such as another UAV.

An example of such a verification process may be assurance of a geo-fenced restriction that is licensed to a particular user. The UAV 102 would be configured with the assigned user identifier (ID) stored in the interrogator device 130. The user would be provided a geo-fence area via a profile in the software package 114, along with a signature for that profile in the license 124. The profile that includes the geo-fence area may be a platform profile 304. Upon startup, the vehicle controller 134 may verify by comparing a hash of the existing geo-fence profile (the platform profile 304) stored in memory 136, the profile signature, and the user ID in the interrogator device 130. This comparison may be performed with data link 106 not in place (e.g., disconnected). If a "bad actor" modified the profile in the memory 136 after installation by the external device 104, the comparison would fail due to mismatch, and vehicle controller 134 would not allow for continued operation. If a "bad actor" copied a profile and signature from some other UAV 102, the different user ID in the interrogator device 130 would cause the comparison to fail, and vehicle controller 134 would also not allow for continued operation of the UAV 102.

Figure 4:
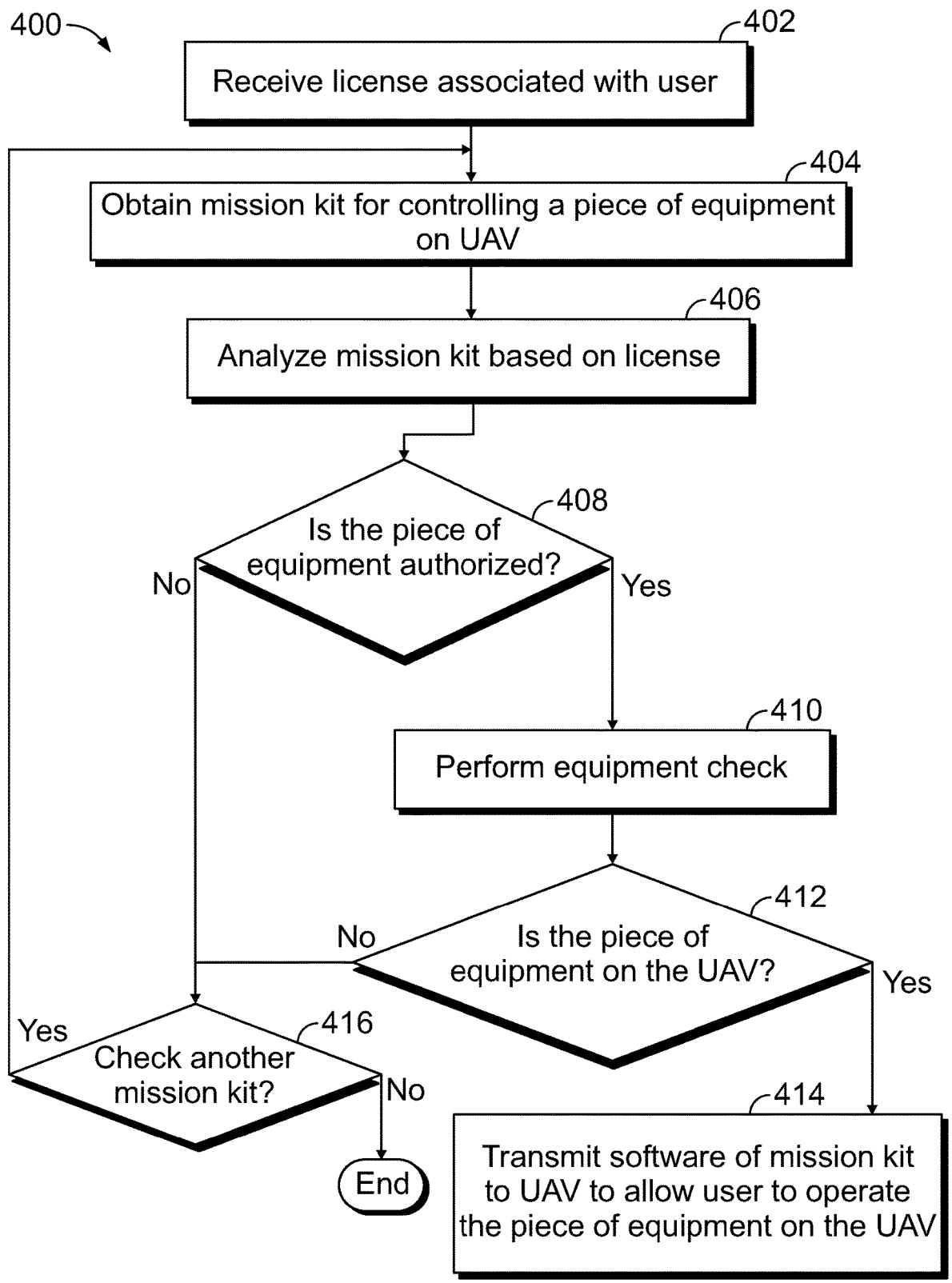
FIG. 4 is a flow chart of a method for authorizing operation of a UAV and equipment installed on the UAV according to an embodiment.

FIG. 4 is a flow chart 400 of a method for authorizing operation of a UAV 102 and equipment installed on the UAV 102 for a user according to an embodiment. The method may include more steps, fewer steps, and/or different steps than shown in the flow chart 400. Furthermore, the steps of the method may be performed in a different order than the chronological order presented in FIG. 4 unless specified. The method includes, at step 402, receiving a license 124 that is associated with a user.

At step 404, a mission kit 116 is obtained by a controller 108. The controller 108 may be disposed on an external computing device 104 that is off-board a UAV 102. The mission kit 116 includes software for controlling a piece of equipment 112 configured to be assembled on the UAV 102. At step 406, the mission kit 116 is analyzed based on the license 124. For example, the license 124 may provide credentials of the user, and the mission kit 116 may be analyzed by comparing the credentials to a look-up table 122 that stores minimum user credentials necessary to authorize operation of the piece of equipment 112.

At step 408, it is determined whether the piece of equipment 112, associated with the mission kit 116, is authorized for operation on the UAV 102 when the user controls the UAV 102. If the license permits the operation of the piece of equipment 112, then the piece of equipment 112 is indeed authorized, and flow proceeds to step 410. The license may permit the operation of the piece of equipment 112 if the user credentials satisfy the minimum user credentials stored in the table 122. If, on the other hand, the piece of equipment 112 is not authorized, due to an insufficient license 124, then flow proceeds to step 416.

At step 410, an equipment check is performed to determine an assembly configuration of the UAV 102. The assembly configuration indicates the modular equipment 112 that is currently assembled and installed onboard the UAV 102, and able to be operated upon receiving equipment-specific software. The equipment check may be performed by an interrogator device 130, which outputs the assembly configuration.

At step 412, it is determined whether the piece of equipment 112, which was authorized in step 408, is actually on the UAV 102. The controller 108 may consult the assembly configuration generated by the interrogator device 130 to check whether the authorized piece of equipment 112 is present on the UAV 102. If the authorized piece of equipment 112 is present, then flow proceeds to step 414. If the authorized piece of equipment 112 is not present, then flow proceed to step 416.

At step 414, at least some software from the mission kit 116 is transmitted to the UAV 102 to allow the user to operate the authorized piece of equipment 112 on the UAV 102 when the user controls the UAV 102.

At step 416, it is determined whether or not to check another mission kit 116 that includes software for controlling another piece of equipment 112. For example, a software package 114 may include multiple different mission kits 116. If there is another mission kit 116 that has not been analyzed to authorize the equipment 112 associated with that mission kit 116, then flow returns to step 404. If all mission kits 116 have been analyzed, then the method may end, at least until a new license 124 is received and/or a new software package 114 is obtained.

Further, the disclosure comprises examples according to the following clauses:

Clause 1. An authorization system comprising:
a controller of an external computing device that is off-board an unmanned aerial vehicle (UAV) and communicatively connected to the UAV, the controller including one or more processors and configured to obtain a mission kit that includes software for controlling a piece of equipment configured to be assembled on the UAV, the controller configured to receive a license that is associated with a user and determine, based on the license, whether the piece of equipment is authorized for operation on the UAV as controlled by the user, wherein responsive to determining that the piece of equipment is authorized, the controller initiates transmission of at least some of the software of the mission kit to the UAV for installation by the UAV to allow the user to operate the piece of equipment.

Clause 2. The authorization system of Clause 1, wherein responsive to the controller determining that the piece of equipment is not authorized, the controller does not initiate the transmission of the software of the mission kit to the UAV.

Clause 3. The authorization system of Clauses 1 or 2, wherein the piece of equipment is a first piece of equipment and the mission kit is a first mission kit of a software package that also includes at least a second mission kit, the second mission kit including software for controlling a second piece of equipment configured to be assembled on the UAV.

Clause 4. The authorization system of any of Clauses 1-3, wherein the mission kit is part of a software package that also includes a platform kit, the platform kit including software for controlling a propulsion system of the UAV, wherein, based on the license, the controller is configured initiate transmission of the software for controlling the propulsion system to the UAV to allow the user to operate the propulsion system of the UAV.

Clause 5. The authorization system of any of Clauses 1-4, further comprising an interrogator device configured to perform an equipment check on the UAV to determine which pieces of equipment are assembled on the UAV, wherein the controller is configured to receive a result of the equipment check, and does not initiate the transmission of the software for controlling the piece of equipment unless the result of the equipment check indicates that the piece of equipment is assembled on the UAV.

Clause 6. The authorization system of any of Clauses 1-5, wherein the license provides credentials of the user, and the controller is configured to determine whether the piece of equipment is authorized for operation on the UAV by comparing the credentials to a look-up table that stores minimum user credentials necessary to authorize operation of the piece of equipment.

Clause 7. The authorization system of any of Clauses 1-6, wherein the mission kit includes multiple profiles that have different operational constraints for limiting operation of the piece of equipment, the operational constraints of a first profile of the profiles enabling a broader scope of operation of the piece of equipment than the operational constraints of a second profile of the profiles, wherein the controller is further configured to determine, based on the license, whether each of the profiles is an authorized profile that is authorized for installation on the UAV as controlled by the user, and to initiate the transmission of the one or more authorized profiles to the UAV.

Clause 8. The authorization system of Clause 7, wherein responsive to determining that the first profile is not authorized and the second profile is authorized, the controller is configured to initiate transmission of the second profile to the UAV without transmitting the first profile to the UAV.

Clause 9. The authorization system of any of Clauses 1-8, wherein the piece of equipment is one of an imaging device, a lighting system, a navigation system, a laser device, a radar device, a radio device, a weapon, or an effector device for carrying objects.

Clause 10. The authorization system of any of Clauses 1-9, wherein the external computing device is conductively connected to the UAV via a cable that is removably connected to the UAV and the external computing device, the controller configured to initiate the transmission of the software for controlling the piece of equipment from the external computing device to the UAV along the cable.

Clause 11. The authorization system of any of Clauses 1-10, further comprising a vehicle controller of the UAV, wherein subsequent to the transmission of the software to the UAV and installation of the software in a memory device onboard the UAV, the vehicle controller prior to operation of the UAV is configured to verify that the software onboard the UAV is unmodified and licensed by comparing a hash of one or more software components currently installed in the memory device against a digital signature of the software of the mission kit associated with the piece of equipment authorized for operation on the UAV as controlled by the user.

Clause 12. A method comprising:
  obtaining a mission kit by a controller of an external computing device that is off-board an unmanned aerial vehicle (UAV), the mission kit including software for controlling a piece of equipment configured to be assembled on the UAV;
  receiving a license that is associated with a user;
  determining, based on the license, whether the piece of equipment is authorized for operation on the UAV as controlled by the user; and
  responsive to determining that the piece of equipment is authorized, transmitting at least some of the software of the mission kit to the UAV for installation by the UAV to allow the user to operate the piece of equipment.

Clause 13. The method of Clause 12, wherein, responsive to determining that the piece of equipment is not authorized for operation on the UAV, the method includes preventing transmission of the software of the mission kit to the UAV.

Clause 14. The method of Clauses 12 or 13, wherein the piece of equipment is a first piece of equipment and the mission kit is a first mission kit of a software package that also includes at least a second mission kit, the second mission kit including software for controlling a second piece of equipment configured to be assembled on the UAV.

Clause 15. The method of any of Clauses 12-14, wherein the mission kit is part of a software package that also includes a platform kit, the platform kit including software for controlling a propulsion system of the UAV, the method further comprising transmitting the software for controlling the propulsion system to the UAV to allow the user to operate the propulsion system of the UAV.

Clause 16. The method of any of Clauses 12-15, further comprising performing an equipment check, after receiving the license, to determine whether the piece of equipment is assembled on the UAV, and the software for controlling the piece of equipment is only transmitted to the UAV after confirming that the piece of equipment is assembled on the UAV.

Clause 17. The method of any of Clauses 12-16, wherein the license provides credentials of the user, and the determination of whether the piece of equipment is authorized for operation on the UAV includes comparing the credentials to a look-up table that stores minimum user credentials necessary to authorize operation of the piece of equipment.

Clause 18. The method of any of Clauses 12-17, wherein the mission kit includes multiple profiles that have different control constraints for operating the piece of equipment, such that the control constraints of a first profile of the profiles enable a broader scope of operating parameters of the piece of equipment than the control constraints of a second profile of the profiles, wherein determining whether the piece of equipment is authorized for operation on the UAV comprises determining that one or more of the profiles of the mission kit are authorized for installation on the UAV based on the license, and transmitting the software for controlling the piece of equipment comprises transmitting the one or more profiles that are authorized to the UAV.

Clause 19. The method of Clause 18, wherein responsive to determining that the second profile is authorized and the first profile is not authorized, transmitting the software for controlling the piece of equipment comprises transmitting the second profile to the UAV and preventing transmission of the first profile to the UAV.

Clause 20. The method of any of Clauses 12-19, wherein transmitting the software for controlling the piece of equipment to the UAV comprises connecting the external computing device to the UAV via a cable and conveying the software along the cable.

Clause 21. An authorization system comprising:
  a memory device of an external computing device that is off-board an unmanned aerial vehicle (UAV), the memory device storing a mission kit that includes software for controlling a piece of equipment configured to be assembled on the UAV, the mission kit including multiple profiles that have different operational constraints for limiting operation of the piece of equipment;
  a communication circuit of the external computing device, the communication circuit configured to communicate with the UAV; and
  a controller of the external computing device, the controller including one or more processors and communicatively connected to the memory device and the communication device, the controller configured to receive a license that is associated with a user and determine, based on the license, whether each of the profiles of the mission kit is an authorized profile that is authorized for installation on the UAV as controlled by the user, wherein, responsive to the controller identifying one or more authorized profiles of the mission kit, the controller is configured to control the communication circuit to transmit at least one of the one or more authorized profiles to the UAV for installation by the UAV to allow the user to operate the piece of equipment.

While various spatial and directional terms, such as top, bottom, lower, mid, lateral, horizontal, vertical, front and the like can be used to describe embodiments of the present disclosure, it is understood that such terms are merely used with respect to the orientations shown in the drawings. The orientations can be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

As used herein, approximating value modifiers such as "about," "substantially," "generally," and "approximately" inserted before a numerical value indicate that the value can represent other values within a designated threshold range above and/or below the specified value without resulting in a change in the basic function to which it may be related. Accordingly, a value modified by a term or terms, such as "about," "substantially," "generally," and "approximately," may be not to be limited to the precise value specified. The approximating terms may indicate inclusion of values within a designated threshold margin of the precise value. The threshold margin may be plus/minus 3% of the precise value, plus/minus 5% of the precise value, plus/minus 10% of the precise value, or the like. Two items or axes that are generally parallel can be angled within 3 degrees of each other in one example, within 5 degrees of each other in a second example, and within 10 degrees of each other in a third example.

It is to be understood that the above description is intended to be illustrative, and not restrictive. For example, the above-described embodiments (and/or aspects thereof) can be used in combination with each other. In addition, many modifications can be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims and the detailed description herein, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and can include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. An authorization system comprising:
   a vehicle controller of an unmanned aerial vehicle (UAV); and
   a controller of an external computing device that is off-board the UAV and communicatively connected to the vehicle controller, the controller including one or more processors and configured to obtain a license that is associated with a user, the controller configured to determine, based on the license, whether a piece of equipment on the UAV is authorized for operation as controlled by the user, wherein responsive to determining that the piece of equipment is authorized, the controller initiates transmission of first software, for controlling the piece of equipment, to the UAV,
   wherein the vehicle controller is configured to receive the first software for controlling the piece of equipment and install the first software in a memory device onboard the UAV, wherein the vehicle controller is configured to verify that software in the memory device, including the first software, is unmodified and licensed prior to allowing the user to operate the UAV and control the piece of equipment.

2. The authorization system of claim 1, wherein responsive to the controller determining that the piece of equipment is not authorized, the controller does not initiate the transmission of the first software to the UAV.

3. The authorization system of claim 1, wherein the first software is part of a software package that also includes a platform kit, the platform kit including second software for controlling a propulsion system of the UAV, wherein, based on the license, the controller is configured initiate transmission of the first software and the second software to allow the user to operate the propulsion system of the UAV.

4. The authorization system of claim 1, further comprising an interrogator device configured to perform an equipment check on the UAV to determine which pieces of equipment are assembled on the UAV, wherein the controller is configured to receive a result of the equipment check, and does not initiate the transmission of the first software for controlling the piece of equipment unless the result of the equipment check indicates that the piece of equipment is assembled on the UAV.

5. The authorization system of claim 1, wherein the license provides credentials of the user, and the controller is configured to determine whether the piece of equipment is authorized for operation on the UAV by comparing the credentials to a look-up table that stores minimum user credentials necessary to authorize operation of the piece of equipment.

6. The authorization system of claim 1, wherein the first software is part of a mission kit that includes multiple profiles that have different operational constraints for limiting operation of the piece of equipment, the operational constraints of a first profile of the profiles enabling a broader scope of operation of the piece of equipment than the operational constraints of a second profile of the profiles, wherein the controller is configured to determine, based on the license, whether each of the profiles is an authorized profile that is authorized for installation on the UAV as controlled by the user, and to initiate the transmission of the one or more authorized profiles to the UAV.

7. The authorization system of claim 6, wherein responsive to determining that the first profile is not authorized and the second profile is authorized, the controller is configured to initiate transmission of the first software to include the second profile without including the first profile.

8. The authorization system of claim 1, wherein the piece of equipment is one of an imaging device, a lighting system, a navigation system, a laser device, a radar device, a radio device, a weapon, or an effector device for carrying objects.

9. The authorization system of claim 1, wherein the external computing device is conductively connected to the UAV via a cable that is removably connected to the UAV and the external computing device, the controller configured to initiate the transmission of the first software from the external computing device to the UAV along the cable.

10. The authorization system of claim 1, wherein the vehicle controller is configured to verify that the software onboard the UAV is unmodified and licensed, prior to operation of the UAV, by comparing a hash of one or more software components currently installed in the memory device against a digital signature of the first software associated with the piece of equipment.

11. A method comprising:
obtaining a license by a controller of an external computing device that is off-board an unmanned aerial vehicle (UAV), the license associated with a user;
determining, based on the license, whether a piece of equipment on the UAV is authorized for operation as controlled by the user;
responsive to determining that the piece of equipment is authorized, transmitting first software, for controlling the piece of equipment, to the UAV;
receiving the first software by a vehicle controller of the UAV;
installing the first software in a memory device onboard the UAV; and
verifying that software in the memory device, including the first software, is unmodified and licensed prior to allowing the user to operate the UAV and control the piece of equipment.

12. The method of claim 11, wherein, responsive to determining that the piece of equipment is not authorized for operation on the UAV, the method includes preventing transmission of the first software to the UAV.

13. The method of claim 11, wherein the first software is part of a software package that also includes a platform kit, the platform kit including second software for controlling a propulsion system of the UAV, the method further comprising transmitting the second software to the UAV to allow the user to operate the propulsion system of the UAV.

14. The method of claim 11, further comprising performing an equipment check, after receiving the license, to determine whether the piece of equipment is assembled on the UAV, and the first software for controlling the piece of equipment is only transmitted to the UAV after confirming that the piece of equipment is assembled on the UAV.

15. The method of claim 11, wherein the license provides credentials of the user, and the determination of whether the piece of equipment is authorized for operation on the UAV includes comparing the credentials to a look-up table that stores minimum user credentials necessary to authorize operation of the piece of equipment.

16. The method of claim 11, wherein the first software is part of a mission kit that includes multiple profiles that have different control constraints for operating the piece of equipment, such that the control constraints of a first profile of the profiles enable a broader scope of operating parameters of the piece of equipment than the control constraints of a second profile of the profiles, wherein determining whether the piece of equipment is authorized for operation as controlled by the user comprises determining that one or more of the profiles of the mission kit are authorized profiles based on the license, and wherein transmitting the first software for controlling the piece of equipment comprises transmitting the one or more authorized profiles to the UAV.

17. The method of claim 16, wherein responsive to determining that the second profile is authorized and the first profile is not authorized, transmitting the first software for controlling the piece of equipment comprises transmitting the second profile to the UAV and preventing transmission of the first profile to the UAV.

18. The authorization system of claim 10, wherein the digital signature of the first software is included in the license that is associated with the user.

19. The authorization system of claim 10, wherein the digital signature of the first software is a second hash of a software identifier associated with the first software and an entity identifier associated with one or more of the user, the UAV, or a business entity.

20. An authorization system comprising:
a controller of an external computing device that is off-board an unmanned aerial vehicle (UAV) and communicatively connected to the UAV, the controller including one or more processors and configured to obtain first software for controlling a piece of equipment onboard the UAV, the controller configured to receive a license that is associated with a user and determine, based on the license, whether the piece of equipment is authorized for operation as controlled by the user, wherein responsive to determining that the piece of equipment is authorized, the controller initiates transmission of at least the first software to the UAV; and
a vehicle controller of the UAV configured to receive the first software and install the first software in a memory device onboard the UAV, wherein the vehicle controller is configured to verify that software stored in the memory device, including the first software, is unmodified and licensed prior to permitting the user to operate the UAV and control the piece of equipment, wherein the vehicle controller is configured to verify that the software stored in the memory device is unmodified and licensed by comparing a hash of at least part of the software installed in the memory device to a digital signature of the first software associated with the piece of equipment.

* * * * *